United States Patent [19]
Tschirky

[11] 3,857,655
[45] Dec. 31, 1974

[54] WEAR SLEEVES FOR SEALED BEARINGS

[75] Inventor: John E. Tschirky, Long Beach, Calif.

[73] Assignee: Smith International, Inc., Newport Beach, Calif.

[22] Filed: Aug. 6, 1973

[21] Appl. No.: 385,836

Related U.S. Application Data

[63] Continuation-in-part of Ser. No. 354,954, April 27, 1973.

[52] U.S. Cl. .................................. 418/48, 175/107
[51] Int. Cl. .............................................. F04c 1/06
[58] Field of Search ....... 418/48; 175/107; 308/36.1

[56] References Cited
UNITED STATES PATENTS

| | | | |
|---|---|---|---|
| 2,137,328 | 11/1938 | Bissell | 308/36.1 |
| 2,496,897 | 2/1950 | Strickland | 308/36.1 |
| 3,149,685 | 9/1964 | Mitchell et al. | 175/107 |
| 3,260,318 | 7/1966 | Neilson et al. | 175/107 |
| 3,365,202 | 1/1968 | Carleton | 175/107 |

FOREIGN PATENTS OR APPLICATIONS 1,473,510   3/1967   France .............................. 175/107

*Primary Examiner*—Carlton R. Croyle
*Assistant Examiner*—O. T. Sessions

[57] ABSTRACT

This invention relates to wear sleeves for sealed shafts.

6 Claims, 4 Drawing Figures

WEAR SLEEVES FOR SEALED BEARINGS

This application is a continuation in part of application Ser. No. 354,954 filed Apr. 27, 1973.

This invention relates to seals for bearing-supported rotary shafts and provides replaceable wear elements to protect the shafts and to maintain seal integrity. The design of the seal and wear element is such that the integrity of the seal is not affected by any transverse deflection of the shaft which could reduce the seal pressure on any surface of the rotating member so as to impair the seal at that surface.

The seal system of my invention is to mount the wear sleeve on either the shaft or the shaft housing, and preferably on the shaft at one end of the wear sleeve so as to create a seal between that end and the shaft and the member on which it is mounted. The wear sleeve is spaced from and is unsupported by the member on which it is mounted through its length except at its mounted end. A seal is mounted between the other member and the adjacent surface of the wear sleeve.

Since the wear sleeve is mounted so that the shaft can deflect in the interior of the sleeve without introducing any substantial angular deflection of the wear sleeve, the seal at the surface of the wear sleeve is unaffected and the integrity of the seal is maintained. The sleeve is a floating sleeve anchored at one end thereof.

These objectives will be described in connection with the preferred embodiment of my invention.

The following description of my invention is directed to my presently preferred embodiment and application of my invention. It will be understood that the wear sleeve and seal may be applied to any rotating element where it is desired to introduce a barrier to a fluid under pressure on one side of the seal. The particular application of my invention is described herein as applied to an in-hole drill described and claimed in the copending application Ser. No. 354,954.

Figure 1:
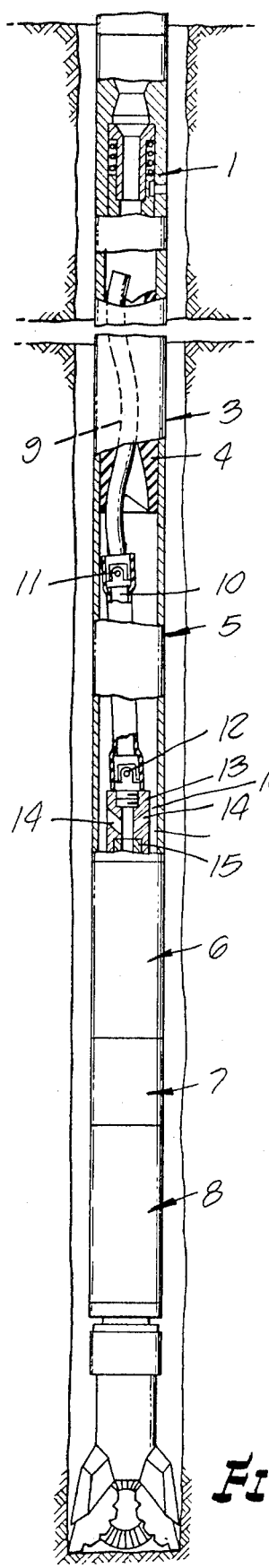
FIG. 1 is a somewhat schematic showing of a shaft assembly.
Figure 3:
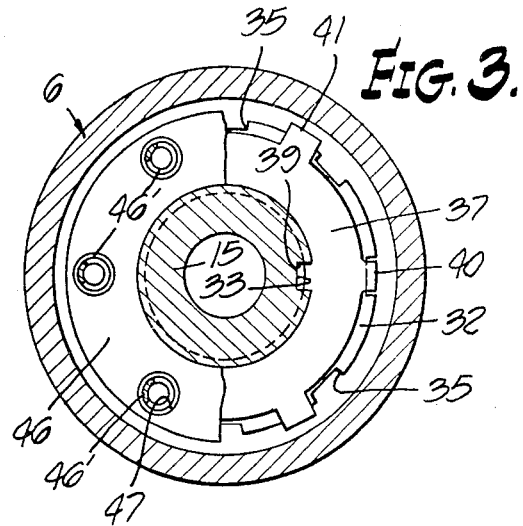
FIG. 3 is a section taken on line 3—3 of FIG. 2.
Figure 4:
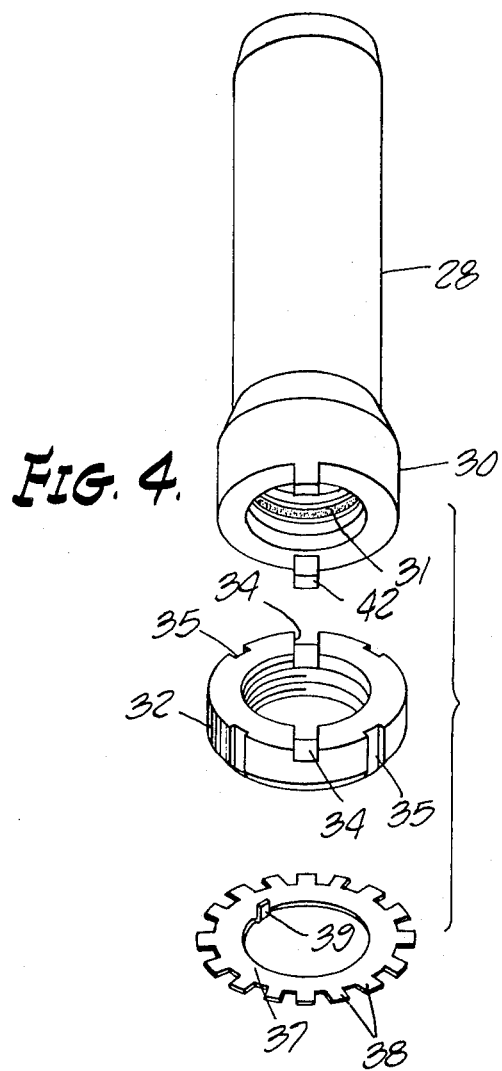
FIG. 4 is a perspective view of a detail of FIG. 2.

The motor shown in FIG. 1 is a progressing cavity motor. The motor housing 3 (see FIG. 1) is connected to the by-pass assembly 1. The motor housing 3 carries a stator 4 bonded to the interior surface of the housing 3. The connecting rod assembly housing 5 is connected to the housing 3 and to the bearing housings 7 and 8. The drive shaft assembly housings 6, 7 and 8 carry the seals and bearing assemblies. The housing 6 is connected by a pin and box connection to the housing 5 and to the housing 7. The housing 7 is connected to the lower drive shaft bearing assembly housing 8, all to be more fully described below.

The rotor 9, mounted inside the stator 4, at its lower end is connected to the connecting rod 10 by a universal joint 11 and to the tubular drive shaft 15 through the drive shaft cap 13 connected to the connecting rod by a like universal joint 12.

The universal joint may be one such as described in the Neilson et al., U.S. Pat. No. 3,260,318, patented July 12, 1966, or in the Neilson et al., U.S. Pat. No. 3,260,069, patented July 11, 1966.

The connecting rod and universal joints may be enclosed in a flexible cover to protect them from erosion by the mud, and to contain the lubricant inside the connecting rod assembly.

The progressing cavity motor shown is of the helicoidal type. The outer body of the motor, that is the stator, is composed of an elastomer, for example, a rubberlike compound, which creates a spiral cavity throughout its length to provide a double spiral groove. The passage of fluid through the stator 4 and past the rotor along its length causes a rotation of the rotor and a movement of the rotor from side to side creating eccentric rotation at the end of the rotor where it is connected to the connecting rod. Because of the universal joints, the eccentric motion is converted into a true rotary motion (concentric) at the drive shaft 15. The fluid as it exits the stator passes through the connecting rod housing 5, around the connecting rod and drive shaft cap 13 through by-pass annulus 16'. The drive shaft cap 13 is provided with orifices 14 (See FIGS. 1 and 2). At this point, the mud is under very high pressure and passes in considerable volume and pressure from the exit of the stator.

For example, and not as a limitation of my invention, the required pressure at the exit of the stator may be, depending on the depth of the bore hole, in the order of 500 to 1,500 pounds per square inch. This is the differential pressure at the bit nozzle. Such pressures are required in order to have the required velocity and fluid volume rate through the bit nozzles in order that there will be the necessary pressure and volume of fluid at the bottom of the hole for better hydraulic and bit cutting action, and to return the cuttings to the surface.

In order to protect the bearings, I provide a barrier seal between the bearings and the stator outlet. In order to protect the shaft, I provide a wear sleeve.

A radial bearing is provided between the stator outlet and the seal and bearing assemblies. I may use any type of radial bearing but prefer to employ the radial bearing flow restrictor assembly disclosed in my copending application Ser. No. 354,954 which is hereby incorporated in this application by this reference.

This radial assembly is composed of a steel sleeve 17 mounted on and sealed by O-rings from the housing 6. The sleeve 17 holds tungsten carbide sleeve 17'. The complementary bearing member consists of a steel sleeve 18 mounted on the shaft 15, carrying circumferentially spaced grooves along its length. The outer diameter of the sleeve 18 is less than the internal diameter of the sleeve 17'.

Tungsten carbide rods 18' are mounted in the grooves and form a rubbing fit with the tungsten carbide sleeve 17'. The spaces between the rods and between the inner steel sleeve and the outer carbide sleeve form restricted passageways 18a.

The passageways communicate with the annulus 27' which is vented to the exterior of the housing at vent 26'.

The packing gland 19 of the seal assembly is composed of a plurality of superposed metallic rings 20 and fibrous Chevron seals member 21 held between the rings. The seal assembly is seated on an internal shoulder 22 of the housing 6. The rings 20 are of an internal diameter greater than the internal diameter of the seals 21. The internal nut 25 carrying wrench bores 23 is screwed down to compress Chevron seals tightly between the rings 20. The lock nut 24 is threaded to lock the nut 25 into position with the dogs 26 entering the notches 27.

The floating wear sleeve 28, which extends the length of the packing gland, is spaced at 29 from the outer surface of the tubular drive shaft 15. The Chevron packing abuts the external surface of the floating wear sleeve 28 which extends beyond the end of the packing gland. The lower enlarged end 30 is sealed by O-ring 31. The nut 32 is threaded onto the tubular shaft 15 which carries a vertical groove 33 interrupting the external threads. The nut, carrying diametrically opposed notches 34 and circumferentially spaced surface grooves 35, is screwed at 36 on the tubular drive shaft 15. It is held against unthreading by the lock washer 37 carrying a plurality of extending fingers 41 circumferentially spaced above the washer and a vertical finger 39. The finger 39 is placed in the groove 33 and the fingers 41 are bent upward into the notches 35.

The sleeve 28 is mounted at its end in an interlock with the shaft 15 for rotation with the shaft 15, by the dogs 36 which enter in notches 34 in the nut 32. The free end of the sleeve 28 enters the annulus 24' between the nuts 24 and 25 and the shaft 15. This permits the sleeve to have transverse adjustability to hold a good seal at the O-ring 31 and the Chevron packing. This is maintained notwithstanding the whip of the drive shaft as a result of unbalanced transverse loading communicated from the random loading of the drive shaft as, for example, by the drill bit. As will be described below, the seal between the sleeve 28 is maintained during the movement of the sleeve relative to the gland 19, when the drive shaft is moved axially with respect of the housing, since the flexible Chevron seal rings 21 remain in sealing contact with the sleeve 28.

The upper bearing assembly is composed of the races 43 and 44 and balls 45 together with the pressure plate 46 and associated springs 47 set in spring retaining bores. The specific design of the spring loaded bearings described herein is described in the aforesaid copending application Ser. No. 354,954.

Figure 2:
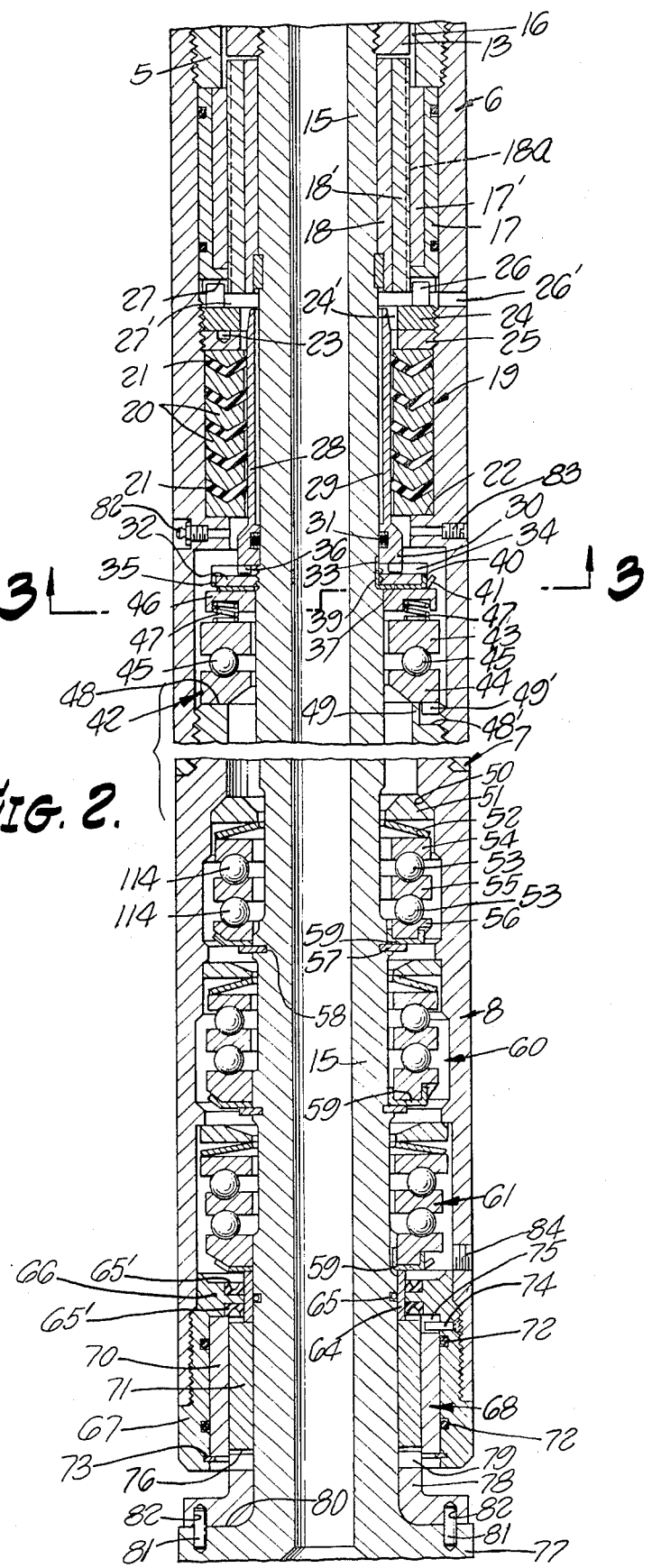
FIG. 2 is a fragmentary section of the assembly of FIG. 1.

The nut 32 exerts pressure on the plate 46 to load the springs 47 and the bearings so that when the weight of the housing is on the bit, as when drilling, the load is off the upper bearing, as is illustrated in FIG. 2. The load imposed by the nut 32 loads the springs to hold the races 44 and 43 snugly against the balls 45. The race 44 is positioned on the top of the end 48 of the pin 49 of the housing 8. The dog 49' integrally formed with the race 44 fits into an end-notch 48' positioned in the end 49.

A lower thrust bearing is positioned in the housing 8 below the upper thrust bearing. A lower radial bearing may also be provided. A second wear plate and seal are usefully provided between the lower bearing assemblies and the end of the housing.

The housing 8 has a beveled shoulder 50, against which is positioned the load plate 51. The races 54, 55, and 56 and balls 53 form an upper tandem bearing assembly. This assembly is supported on the retaining ring 57 positioned in the groove 58 of the drive shaft 15.

The lowermost race 56 is locked in position on the drive shaft 15 by means of a lock washer 59 of construction similar to the lock washer 37. The Belleville spring 52 is positioned between the race 54 and the load transmitting pressure plate 51 sealed against the beveled shoulder 50.

Any desired number of similar bearing assemblies may be provided. Three are shown in FIG. 2. In the lower two assemblies 60 and 61, square shoulders 62 on the housing are provided.

Each of the assemblies has, as described in connection with the upper assembly, races loaded by Belleville spring washers, the lower race being locked to the shaft and spaced from the housing and the upper races of each assembly free of the shaft as in the upper assembly.

Each of the lowermost races of the lower two assemblies 60 and 61 is locked to the shaft by lock washers 59 of the same construction as lock washer 59 on the race 56.

The end bearing assembly positioned at the end of the shaft and housing is constructed in any desired manner but preferably it is constructed in the manner employing two tungsten carbide sleeves with suitable seals.

The spacer sleeve 64 sealed by O-ring 65 is positioned on the drive shaft 15 and abuts underneath the lock washer 59 on the lowermost race. The radical bearing assembly 68 carries radial seals 65' which seal against the inner surface of the end flange 66 of the fitting 67 and the spacer 64. Two concentric and contiguous cylinders 70 and 71 formed of hard materials such as tungsten carbide or other material similar to the upper radial bearings are positioned in the fitting 67 to form a radial bearing, the outer tungsten carbide cylinder 70 sealed against the inner surface of 67 and by O-rings 72 and held in position by retaining ring 73 and anti-rotation screw 74 which enters the notch 75.

The complimentary tungsten carbide sleeve 71 is mounted on the surface of the drive shaft 15 to be positioned underneath the spacer 64. The end of the sleeve 71 carries notches 76.

The tungsten carbide cylinders are polished and form a sliding fit. The sleeve 71 is locked to the shaft, and the sleeve 70 is locked to 67.

The drill bit box 77 is formed integrally with the drive shaft 15 at the end thereof. The box carries a fitting of 78 which has dogs 79 diametrically arranged which are adapted to fit into the notches 76. The fitting 78 is located on the drill bit box shoulder 80 by pins 81 positioned in the box 80 and by entry into the bores 81'.

The space underneath the packing gland 19 and above the seals 65 may be filled with lubricant through the pressure fitting 82. The plugs 82 and 84 may be removed to provide vents. When the lubricant escapes through 83, 84 is sealed by the plug; and when lubricant escapes through 83, it is resealed.

It will be observed that the bore hole pressure at the orifice 26' and at the end of the fitting 67 is substantially the same and the mud pressure differential is thus substantially zero. The seal is thus requried to hold only a substantially zero pressure differential. Mud is thus kept out of the bearings.

When the bit is raised off bottom, the drill string and housings are raised by the drilling lines from which they are suspended and the rotor, connecting rod, shaft and drill move downward with respect of the housing.

The weight of the drill string and housing is off the lower thrust bearing assembly. However, the Belleville springs are in sufficient compression to hold the races against the balls.

In the position shown in the Figures as described above, the weight of the rotor, connecting rod, drive shaft and drill bit is off the upper bearing. The housings have been displaced downward with respect of the shaft. This relieves the load on the upper thrust bearings. However, a residual compression of springs 47 remains holding the races 43 and 44 against the balls 45.

The weight of the rotor, connecting rod, shaft and bit is now supported by the upper bearing assembly, further compressing the springs 47.

The depth of the notches 27, 48' and 76 and length of dogs 26, 49' and 79 are sufficient so that the dogs remain in the notches during the displacement of the shaft and the housing when the bit is on bottom.

During the displacement of housing relative to the shaft, the wear sleeve 28 moves axially over the seal members 21. The relative axial length of the packing gland 19 and the sleeve 28 are such that the length of the sleeve 28 is greater than the axial extent of the packing gland. The packing gland remains in sealing relation to the wear sleeve during the relative axial displacement of the wear sleeve and packing gland.

The aforesaid application Ser. No. 354,954 filed Apr. 27, 1973 is herewith incorporated by this reference.

I claim:

1. A sealed shaft assembly comprising a shaft member, a housing member for said shaft, a wear sleeve mounted in said housing and connected to said shaft at one end of said sleeve, said sleeve being otherwise unsupported by either of said members, a seal between said wear sleeve and one of said members mounted at one end and one surface of said wear sleeve, the sleeve above said seal being spaced from said members, a packing gland mounted in sealing contact with said sleeve and the other of said members.

2. In the assembly of claim 1, a bearing mounted in said housing between said shaft and said housing, a fluid inlet to said housing, said seals and wear sleeve positioned in said housing between said inlet and said bearing.

3. The assembly of claim 2 in which said bearing is a thrust bearing.

4. A progressing cavity fluid motor which includes a rotor, a stator, and a stator housing, tubular shaft means connected to said rotor, a housing for said shaft means, a fluid inlet into said stator and a fluid outlet from said stator, a fluid passageway from said stator, a fluid passageway from said stator outlet and into said tubular shaft means, radial and thrust bearings mounted in said shaft housing between said shaft housing and said shaft the improvement which comprises a seal mounted in said shaft housing between said thrust bearing and said fluid outlet, a sleeve mounted at one end thereof on said shaft for rotation with said shaft, a seal between one end and said shaft, the said sleeve being free and spaced from said shaft at the other end and a packing between said sleeve and said housing.

5. A sealed bearing assembly for a rotating shaft subject to cyclic forces acting transversely to the axis of said shaft comprising a housing, a shaft extending beyond an end of said housing, a fluid inlet to said housing, a bearing between said shaft and said housing, a second bearing in said housing between said shaft and said housing, a wear sleeve and seal assembly between said fluid inlet and said first-named bearing, said wear sleeve and seal assembly comprising a packing gland in sealing contact with the wear sleeve and said housing, said wear sleeve connected at one end to said shaft, a seal between the said end of the sleeve and said shaft, the wear sleeve beyond said seal being spaced from and unsupported by said shaft.

6. A fluid motor which includes a rotor, a stator, and a stator housing, a shaft connected to said rotor for rotation by said rotor, a housing for said shaft connected to said stator housing, a fluid inlet into said stator housing, and a fluid outlet from stator into said shaft housing, thrust bearings mounted in said shaft housing between said shaft housing and said shaft, seal mounted in said shaft housing between said thrust bearing and said fluid outlet, a sleeve mounted at one end thereof on said shaft for rotation with said shaft, a seal between said end and said shaft, said sleeve being spaced from and unsupported by said shaft between said first named seal and said free end, a packing between said sleeve and said housing.

* * * * *